US008887394B2

(12) United States Patent
Schoegl et al.

(10) Patent No.: US 8,887,394 B2
(45) Date of Patent: Nov. 18, 2014

(54) DEVICE AND METHOD FOR CALIBRATING A SINTERED MOLDED PART

(75) Inventors: Franz Schoegl, Neukirchen (AT); Herbert Schmid, Vorchdorf (AT); Christian Kronberger, Vorchdorf (AT); Dietmar Gebhart, Schwanenstadt (AT); Johannes Koller, Vorchdorf (AT)

(73) Assignee: Miba Sinter Austria GmbH, Laakirchen (AT)

( * ) Notice: Subject to any disclaimer, the term of this patent is extended or adjusted under 35 U.S.C. 154(b) by 921 days.

(21) Appl. No.: 12/450,562

(22) PCT Filed: Mar. 26, 2008

(86) PCT No.: PCT/AT2008/000105

§ 371 (c)(1),
(2), (4) Date: Sep. 30, 2009

(87) PCT Pub. No.: WO2008/122062

PCT Pub. Date: Oct. 16, 2008

(65) Prior Publication Data

US 2010/0098575 A1 Apr. 22, 2010

(30) Foreign Application Priority Data

Apr. 4, 2007 (AT) ................................ GM217/2007

(51) Int. Cl.
*B21D 53/28* (2006.01)
*B21K 1/30* (2006.01)
*B23P 15/14* (2006.01)

(52) U.S. Cl.
USPC .......................................... 29/893.35; 409/60

(58) Field of Classification Search
USPC .......................................... 29/893.35; 409/60
IPC .... B23P 15/14; B22F 5/08,3/164; F16H 55/06; B21K 1/30
See application file for complete search history.

(56) References Cited

U.S. PATENT DOCUMENTS

| | | | | |
|---|---|---|---|---|
| 5,366,363 | A | 11/1994 | Good et al. | |
| 6,085,418 | A * | 7/2000 | Matsubara et al. | 29/893.35 |
| 6,113,848 | A | 9/2000 | Sugimoto et al. | |
| 6,383,447 | B1 | 5/2002 | Nakata et al. | |
| 7,025,929 | B2 | 4/2006 | Trasorras et al. | |
| 7,140,269 | B2 | 11/2006 | Arlt et al. | |
| 2011/0132057 | A1 | 6/2011 | Schmid et al. | |

FOREIGN PATENT DOCUMENTS

| | | |
|---|---|---|
| CN | 101557894 A | 10/2009 |
| DE | 102 22 132 | 12/2003 |
| DE | 698 22 572 | 2/2005 |
| EP | 0 528 761 | 2/1993 |

(Continued)

OTHER PUBLICATIONS

International Search Report of PCT/AT2008/000105, Mar. 9, 2010.

*Primary Examiner* — Weiping Zhu
(74) *Attorney, Agent, or Firm* — Collard & Roe, P.C.

(57) ABSTRACT

The invention describes a device (1) for calibrating a sintered molded part (2) with an angular toothing (3) by means of a calibrating tool (4), comprising a lower punch (15) for mounting the sintered molded part (2) with a lower punch external toothing (23), a vertically movable and axially rotatably mounted upper punch (8) with an upper punch external toothing (21), as well as an axially rotatably mounted die (14) with a die internal toothing (24). The lower punch (15) is mounted to be moveable only in vertical direction.

6 Claims, 2 Drawing Sheets

(56) References Cited

FOREIGN PATENT DOCUMENTS

| | | | |
|---|---|---|---|
| EP | 0 955 115 | | 11/1999 |
| JP | S 59-194347 | U | 12/1984 |
| JP | 08-332597 | A | 12/1996 |
| JP | 09-176701 | | 7/1997 |
| JP | 11-061203 | A | 3/1999 |
| JP | 2000-102898 | A | 4/2000 |
| JP | 2003-326400 | A | 11/2003 |
| JP | 2007-077434 | | 3/2007 |
| KR | 10-0828413 | B1 | 5/2008 |
| WO | WO 02/28576 | | 4/2002 |

* cited by examiner

DEVICE AND METHOD FOR CALIBRATING A SINTERED MOLDED PART

CROSS REFERENCE TO RELATED APPLICATIONS

This application is the National Stage of PCT/AT2008/000105 filed on Mar. 26, 2008, which claims priority under 35 U.S.C. §119 of Austrian Application No. GM 217/2007 filed on Apr. 4, 2007. The international application under PCT article 21(2) was not published in English.

The invention relates to a device for calibrating a sintered moulded part with an angular toothing by using a calibrating tool, comprising a lower punch for mounting the sintered moulded part with a lower punch external toothing, a vertically movable and axially rotatably mounted upper punch with an upper punch external toothing, and an axially rotatably mounted die with a die internal toothing as well as a method for calibrating a sintered moulded part with an angular toothing with a calibrating tool, comprising a lower punch with a lower punch external toothing, a vertically movable and axially rotatably mounted upper punch with an upper punch external toothing, and an axially rotatably mounted die with a die internal toothing, according to which the sintered moulded part is placed on the lower punch and positioned on the latter, then the upper punch is lowered in the direction of the sintered moulded part and in this way the sintered moulded part and the lower punch are lowered in the direction of the die and thus the angular toothing of the sintered moulded part is pressed into the die internal toothing.

From U.S. Pat. No. 7,025,929 B a method is known for subsequently compacting the teeth of a gearwheel with an angular toothing. For this after compacting the powder and subsequent sintering the latter is pushed by a punch through a die, which on the inner surface has a toothing that is complementary to the gearwheel. By means of this pushing through the areas of the toothing close to the surface are compacted further. The gearwheel is moved exclusively by an axial helical-like movement though the die. The die comprises a plurality of part dies which are separated from another by means of separating discs.

DE 698 22 572 T2 describes a device for adjusting the size of the tooth profile of angular gearwheels, which comprises a lower stamp, whereby a gearwheel blank with teeth formed thereon is set up to be placed on the latter, an upper stamping means which can be moved vertically to press the gearwheel blank downwards and a size adjusting measurement form which is set up so that the internal circumferential teeth thereof are in engagement with the gearwheel blank pressed by the upper stamp, in order to adjust the size of the tooth profile of the gearwheel blank. The lower stamp comprises a first and a second lower stamp, whereby the second lower stamp is set up to support a said gearwheel blank which is placed thereon in a non-rotatable manner and the first lower stamp is axially rotatable about the second lower stamp and has external circumferential teeth thereon, whereby the size adjusting measurement form can be moved axially rotatably and vertically, whereas its inner circumferential teeth are moved into engagement with the external circumferential teeth of the first lower stamp, and whereby the upper stamping means is axially rotatable and provided with external circumferential teeth, which come into engagement with the inner circumferential teeth of the size adjusting measurement form. Furthermore, said DE 698 22 572 T2 describes a method for adjusting the size of tooth profiles of angular gearwheels, after a gearwheel blank with teeth formed thereon is positioned non-rotatably on a lower stamp, then the size of the tooth profile of the gearwheel blank is adjusted by pressing the gearwheel blank downwards with an upper stamping means into a size adjusting measurement form, whereas the teeth of the gearwheel blank and external circumferential teeth of the upper stamping means are in engagement with the internal circumferential teeth of the size adjusting measurement form and—on completing the size adjusting step—, the size adjusting measurement form is released out of engagement with the upper stamping means and the gearwheel blank by rotating and lowering the size adjusting measurement form and moving the upper stamping means upwards and the gearwheel blank is removed.

The objective of the invention is to provide a simple device for calibrating a sintered moulded part with an angular toothing and a method that is simple to perform.

This objective is achieved independently in that in the device according to the invention the lower punch is mounted so as to move only vertically, and in the method according to the invention the direction of movement of the lower punch after reaching a lower end position is reversed and the calibrated sintered moulded part is moved by the vertical movement of the lower punch upwards out of engagement with the internal toothing of the die.

It is an advantage in this case that by having the lower punch only being able to move in vertical direction the movement sequence of the tool can be simplified, in that an additional drive device for the rotational movement of the lower punch, as is known from the prior art, can be dispensed with. In addition, the bearing of the die can be performed more easily as the finally calibrated sintered component is ejected by an upwards movement of the lower punch. As a result it is possible to design the feeding and removal devices of the sintered component towards and from the tool to be simpler, as the feeding of the blank is performed on one plane or at the same height as the removal of the finally calibrated sintered component. In this way it is easier to automate the device or method for calibrating a sintered moulded part. In addition, no additional masses have to be moved vertically so that the energetic balance of the devices is more favourable.

It is also possible for the die to be mounted to be only rotatable, whereby an additional drive device for lowering the die, as is known and necessary from the prior art for demoulding the sintered moulded part, can be omitted, thus allowing a further simplification of the device.

The upper punch of the calibrating tool can be effectively connected with a guiding unit which during the calibrating process of the sintered moulded part sets the upper punch in the die into a rotational movement, whereby a relative movement between the workpiece and the upper punch are avoided during the calibration.

It is also possible to design the upper punch and/or the lower punch to be in one piece, thereby achieving a further simplification of the calibrating tool and thus the calibrating tool can also be performed more inexpensively.

The lower punch or upper punch can form the drive device for the axial rotational movement of the die, thus dispensing with an additional drive device for this and in addition the synchronisation of the movement of the die with the movement of the lower punch or the upper punch is simpler to perform. The rotational movement of the die can thus be performed by lowering the upper punch or the lower punch following the engagement of the respective external toothing with the internal toothing of the die.

According to one embodiment variant of the method an axial rotation of the upper punch is initiated before the upper punch hits the sintered moulded part or the blank, whereby by means of this rotation the engagement position of the external toothing of the upper punch is formed into the internal toothing of the die. It is thus achieved that the upper punch can be moved from any relative position to the die automatically into the engagement position, so that there can be an additional adjustment of the movement of the upper punch and said synchronisation movement need not be undertaken.

It is also possible that the upper punch after lowering the sintered moulded part onto a bearing surface of the die does not rotate axially together with the lower punch by means of the upper punch, so that by moving together the upper punch with the lower punch there is a complete compaction of the sintered moulded part over its cross section bidirectionally—as viewed in axial direction, i.e. by means of the method according to the invention not only can the calibration of the toothing be performed but also at the same time the said total compaction. Thus in this way with a single device both the calibration and the compaction of the sintered moulded part blank can be performed.

Moreover to avoid a relative movement between the sintered moulded part and the upper punch it is possible, that according to one embodiment variant of the method the upper punch is rotated during the calibrating process of the sintered moulded part in the die and synchronously to the rotation of the die.

For a better understanding of the invention the latter is explained in more detail with reference to the following Figures.

In a schematically much simplified view.

Figure 1:
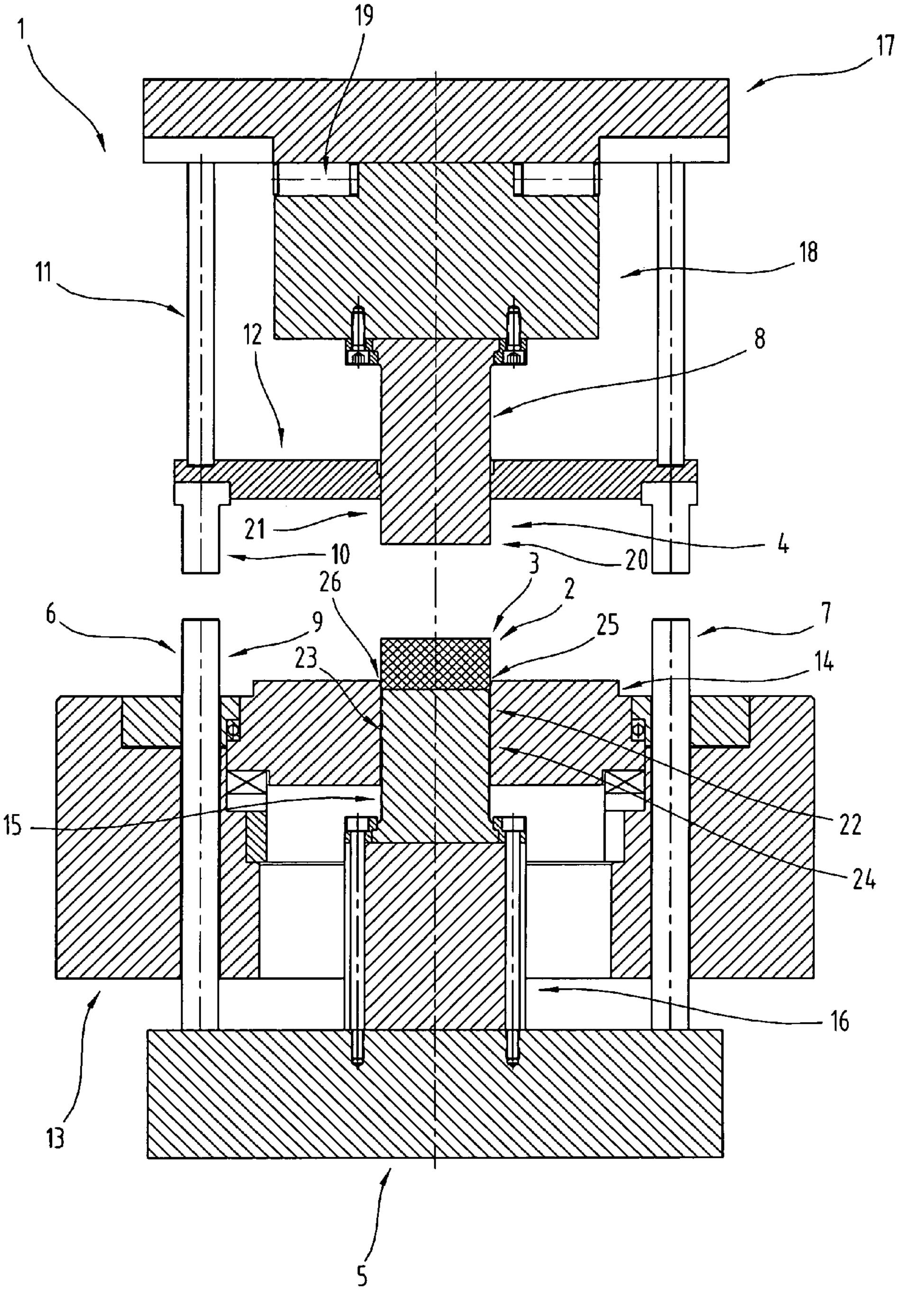
FIG. 1 shows a device according to the invention in the open insertion position for the sintered moulded part.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

Figure 2:
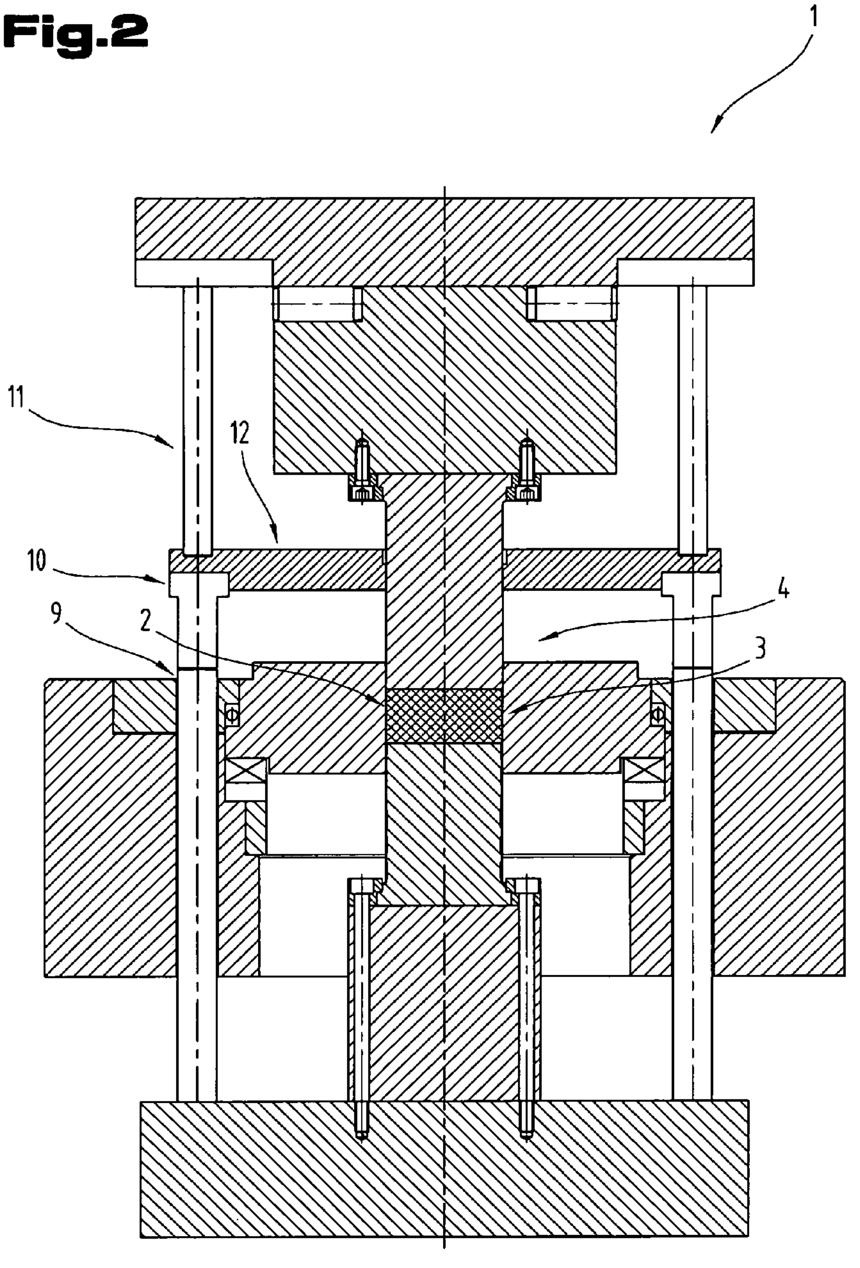
FIG. 2 shows the device according to FIG. 1 in the calibrating position.

FIGS. 1 and 2 show a device 1 for calibrating a sintered moulded part 2 with an angular toothing 3 by using a calibrating tool 4. In this case FIG. 1 represents the open position of the device 1, in which the sintered moulded part 2 to be processed can be inserted into said device 1, whereas FIG. 2 shows a closed view of the device 1, in which the sintered moulded part 2 is calibrated in the calibrating tool 4.

This device 1 is provided for calibrating angular teeth 3 on gearwheels, sprocket wheels or the like, i.e. to improve the dimensional accuracy of these sintered molded parts 2, in particular the angular toothing 3, i.e. the precision of the teeth. For this the sintered molded part 2, for example a gearwheel, is produced with an excess height, whereby said excess dimension can also be found in radial direction and possibly also in axial direction, so that the sintered molded part 2 can be pressed both axially and radially into the final dimension of said sintered molded part 2.

By means of calibration the surface roughness of the sintered moulded part 2 is also reduced, whereby the wearing behaviour of the sintered moulded part 2 can be improved.

The device 1 comprises a lower punch mount 5 on which the columns 6, 7 are supported. The columns 6, 7 are used on the one hand for mounting the calibrating tool 4 and on the other hand for guiding the vertical movement of an upper punch 8. Furthermore, the columns 6, 7 can also be used for controlling the movement of the upper punch 8. For this the columns 6, 7 in this embodiment variant comprise four upper punch rotation elements 9-12. By means of the upper punch rotation element 10 the maximum vertical mobility of the upper punch 8 can be limited. The upper punch rotation element 12 can also be used for vertically supporting the upper punch, in order to avoid the twisting of the upper punch 8. The lower punch mount 5 thus forms the control plane.

Furthermore, a die mount 13 for a die 14 is supported on said guiding columns 6, 7. A lower punch 15 is mounted in this embodiment variant by a lower punch support 16, which is supported on the lower punch mount 5.

The upper punch 8, the die 14 and the lower punch 15 form the calibrating tool 4.

The upper punch 8 is mounted to move vertically by an upper punch mount 17, whereby said upper punch mount 17 is supported on the upper punch rotation element 11 and during the upwards movement of the upper punch 8 is moved onto the upper punch rotation element 9 up to a stop between the latter and the upper punch rotation element 10, as also shown from FIG. 2.

An upper punch support 18 is arranged between the upper punch 8 and the upper punch mount 17, whereby a bearing 19 can be formed or arranged at least partly between the upper punch mount 17 and the upper punch support 18.

In one embodiment variant it is possible to replace the respective columns 6, 7 with a single continuous column, whereby in this case the upper punch mount 17 is mounted to be vertically displaceable along said continuous columns.

The upper punch 8 comprises at least in an end section 20 pointing towards the lower punch 15 an upper punch external toothing 21.

The lower punch 15 comprises at least in an end section 22 pointing towards the upper punch 8 a lower punch external toothing 23.

However, the die 14 comprises a die internal toothing 24 in the region of a die opening 25, i.e. on an inner surface of said die opening 25. The die internal toothing 24 is designed to be complementary to the angular toothing 3 of the sintered moulded part 2 and also complementary to the upper punch external toothings 21 of the upper punch 8 and the lower punch external toothing 23 of the lower punch 15.

The sintered moulded part 2 in the view according to FIGS. 1 and 2 is shown as a simple component without any graduations etc. Within the scope of the invention it is also possible however to calibrate the angular toothing 3 of more complex sintered moulded parts 2, whereby e.g. the upper punch 8 in the lower end section 20 can have a not shown graduation inwardly. Likewise the lower punch 15 can be designed to be complementary to the latter, so that also two-part and multi-part sintered moulded parts 2 can be processed.

Although the upper punch 8 and also the lower punch 15 in the shown embodiment variant are designed in one piece, the latter can also be designed in several parts according to the graduation(s) for processing multistepped sintered moulded parts 2, whereby the individual punch parts can be arranged sleeve-like over one another in radial direction, i.e. one component encases the next respective component. The one-piece design of the upper punch 8 and lower punch 15 is also possible however for producing multi-stepped sintered moulded parts 2, but is associated with higher tool costs.

It is also possible, that the lower punch 15 grips a so-called core pin—not shown—, which in the lower punch 15 is arranged extending in axial direction centrally along a middle axis, onto which sintered moulded parts 2 are pushed, which have a corresponding central recess, and said sintered moulded parts 2 are thus positioned over said core pin. The core pin can be designed in one piece with the lower punch 15 or can be a separate component. To arrange a core pin the upper punch 8 has a corresponding recess, into which the core pin can be inserted. Also several core pins can be arranged in case sintered moulded parts 2 with several openings in axial direction are to be processed. Accordingly also the upper punch 8 can comprise several recesses. The core pin or pin(s) project(s) in the insertion position for the sintered moulded part 2 in the direction of the upper punch 8 over the die 14, so that the sintered moulded part 2 can be pushed on.

Of course, the precise design of the upper punch 8 and the lower punch 15 can differ from the variant shown in FIG. 1 and FIG. 2, as the latter is adjusted in the end to the geometry of the sintered moulded part 2.

To insert the sintered moulded part 2 into the die 14 more easily an end section 26 of the die 14, which is aligned to the upper punch 8, is designed to widen outwardly in the form of a cone, as shown in FIG. 1.

FIG. 2 shows the calibrating tool 4 in the closed form, i.e. the upper punch 8 lies on the sintered moulded part 2 and said sintered moulded part 2 is mounted in turn on the lower punch 15. In the calibrating position the sintered moulded part 2 is lowered into the die 14, so that the toothing of the sintered moulded part 2 comes into contact with the die internal toothing 24 of the die 14 and thus the angular toothing 3 of the sintered moulded part 2 can be calibrated.

In order to reach this position according to FIG. 2 both the upper punch 8 and the lower punch 15 are lowered in vertical direction.

To produce the sintered moulded part 2, i.e. calibrate the latter, said sintered moulded part 2 is placed in a first step on the lower punch 15 of the calibrating tool 4, as shown in FIG. 1. Then by means of the vertical lowering of the upper punch 8 the closing movement is initiated, whereby the upper punch 8 can be set into a rotational movement before hitting the sintered moulded part 2, in order thus to achieve the precise relative position of the upper punch external toothing 21 of the upper punch 8 with the die internal toothing 24 of the die 14, so that lowering the upper punch external toothing 21 of the upper punch 8 into the die internal toothing 24 of the die 14 can be ensured without difficulty.

Once the upper punch 8 has hit the sintered moulded part 2 and thus the calibrating tool 4 is closed, the sintered moulded part 2 together with the lower punch 15 are moved together by the vertical movement of the upper punch 8 into the calibrating position, whereby the lower punch 15 is moved further downwards as with the upper punch 8 and thus the upper punch external toothing 21 of the upper punch 8 comes into engagement with the die internal toothing 24 of the die 14.

By means of the downwards movement of the lower punch 15 via its lower punch external toothing 23 the die 14 is set by the engagement of said lower punch external toothing 23 with the die internal toothing 24 of the die 14 into a horizontal, i.e. axial rotational movement, so that the die 14 rotates about the lower punch 15. By means of this rotational movement it is possible to calibrate obliquely toothed sintered moulded parts 2. The drive of the die 14 is performed in this embodiment variant by means of the lower punch 15, i.e. its downwards movement or its vertical movement.

The rotational movement of the upper punch 8 is stopped after adjusting the synchronous position, i.e. the position which allows the simple engagement of the upper punch external toothing 21 with the die internal toothing 24 of the die 14, so that said upper punch 8 in this phase of the production process moves only vertically and thus enables the compaction of the entire sintered moulded part 2.

During the actual calibrating process of the angular toothing 3 of the sintered moulded part 2, whereby it is noted that the calibration owing to the oversize of the sintered moulded part 2 also corresponds to a compacting process, the upper punch 8 is set into a rotational movement by a separate guiding unit, so that since the sintered moulded part 2 rotates because of the downwards movement of the lower punch 15, a relative movement is avoided between the sintered moulded part 2 and the upper punch 8.

After the completion of the calibrating process, i.e. when the lower punch 15 has reached its lower end position, the direction of movement is reversed, whereby the die 14 remains unchanged with regard to its horizontal arrangement in the device 1 and the lower punch 15 moves vertically upwards, whereby the upper punch 8 also moves upwards. If necessary, this upwards movement of the upper punch 8 can be supported by an additional driving device which is connected actively with the upper punch 8, so that the calibrating tool 4 opens during the upwards movement. By means of the upwards vertical movement of the lower punch 15 the sintered molded part 2 is moved out of the engagement position, i.e. the calibrating position, in the die 14, and released from the die 14, whereby the die 14 is also rotated during the upwards movement, but in the opposite direction, and after opening the calibrating tool 4, whereby the opening position can correspond to the insertion position according to FIG. 1, and the sintered molded part 2 can be disengaged from the lower punch 15 and removed.

In one embodiment variant of the invention it is possible for the die 14 to perform a lowering movement, when the upper punch 8 and the lower punch 15 are fixed relative to one another, to achieve a compaction, however the embodiment variant is preferred in which the die performs only a rotational movement.

The exemplary embodiments show possible embodiment variants of the device 1 for calibrating a sintered moulded part 2 with an angular toothing 3, whereby it should be noted at this point that the invention is not restricted to the embodiment variants shown in particular, but rather various different combinations of the individual embodiment variants are possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the device 1 the latter has not been represented true to scale in part and/or has been enlarged and/or reduced in size.

The underlying problem of the independent solutions according to the invention can be taken from the description.

Mainly the individual embodiments shown in FIGS. 1, 2 form the subject matter of independent solutions according to the invention. The objectives and solutions according to the invention relating thereto can be taken from the detailed descriptions of these figures.

LIST OF REFERENCE NUMERALS

1 Device
2 Sintered moulded part
3 Angular toothing
4 Calibrating tool
5 Lower punch mount

6 Column
7 Column
8 Upper punch
9 Upper punch rotation element
10 Upper punch rotation element
11 Upper punch rotation element
12 Upper punch rotation element
13 Die mount
14 Die
15 Lower punch
16 Lower punch support
17 Upper punch mount
18 Upper punch support
19 Bearing
20 End section
21 Upper punch external toothing
22 End section
23 Lower punch external toothing
24 Die internal toothing
25 Die opening
26 End section

The invention claimed is:

1. Method for calibrating a sintered molded part with an angular toothing by means of a calibrating tool, comprising a lower punch with a lower punch external toothing, a vertically movable and axially rotatably mounted upper punch with an upper punch external toothing, as well as an axially rotatably mounted die with a die internal toothing, according to which the sintered molded part is placed onto the lower punch and positioned on the latter, then the upper punch is lowered in the direction of the sintered molded part, and in this way the sintered molded part and the lower punch are lowered in the direction of the die, and thereby the angular toothing of the sintered molded part is pressed into the die internal toothing, wherein the lower punch is moved only in vertical direction and the direction of movement of the lower punch is reversed after reaching a lower end position and the calibrated sintered molded part is moved by the vertical movement of the lower punch upwards out of engagement with the die internal toothing of the die, whereby the upper punch also moves upwards by the upward movement of the lower punch, and wherein the die only rotates and is not lowered for demolding the gear.

2. Method according to claim 1, wherein an axial rotation of the die and thereby the calibration of the sintered molded part are initiated by lowering the lower punch with the sintered molded part.

3. Method according to claim 1, wherein an axial rotation of the upper punch is initiated before the upper punch hits the sintered molded part.

4. Method according to claim 1, wherein the upper punch after a lowering of the sintered molded part onto a bearing surface of the die together with the lower punch by means of the upper punch does not rotate axially and the sintered molded part is compacted in this way bidirectionally over its entire cross section in axial direction.

5. Method according to claim 1, wherein the upper punch is rotated during the calibrating process of the sintered molded part in the die.

6. Method according to claim 1, wherein by the downward movement of the lower punch via the lower punch external toothing of the lower punch the die is set by the engagement of said lower punch external toothing with the die internal toothing of the die into an axial rotational movement so that the die rotates about the lower punch.

* * * * *